US005467479A

United States Patent [19]

Mattes

[11] Patent Number: 5,467,479
[45] Date of Patent: Nov. 21, 1995

[54] NIGHT VISION GOGGLE MOUNT

[75] Inventor: Paul B. Mattes, Garland, Tex.

[73] Assignee: Varo Inc., Garland, Tex.

[21] Appl. No.: 58,945

[22] Filed: May 7, 1993

[51] Int. Cl.⁶ .............................. A42B 1/24; A42B 3/00; A61F 9/02
[52] U.S. Cl. ........................................ 2/6.3; 2/6.7; 2/422
[58] Field of Search .................... 2/6.2, 6.7, 422, 2/10, 453, 424, 6.3; 359/409, 815; 250/214 VT

[56] References Cited

U.S. PATENT DOCUMENTS

| 2,517,892 | 8/1950 | Larrabee et al. | 359/409 |
|---|---|---|---|
| 3,435,460 | 4/1969 | Grant | 2/422 |
| 3,971,933 | 7/1976 | Adamson, Jr. | 250/213 |
| 4,449,787 | 5/1984 | Burbo et al. | 350/538 |
| 4,463,252 | 7/1984 | Brennan et al. | 250/213 |
| 4,536,892 | 8/1985 | Brinkhoff et al. | 2/424 |
| 4,592,096 | 6/1986 | Glasheen | 2/427 |
| 4,672,194 | 6/1987 | Kastendieck et al. | 250/214 VT |
| 4,907,296 | 3/1990 | Blecha | 2/6.2 |
| 4,953,963 | 9/1990 | Miller | 359/409 |
| 4,987,608 | 1/1991 | Cobb | 2/6.2 |
| 5,226,181 | 7/1993 | Polednak | 2/422 |

OTHER PUBLICATIONS

M982/M983 Brochure "New!" Litton Model M982/M983 Night Vision Monocular 2 page brochure.

*Primary Examiner*—Peter Nerbun
*Attorney, Agent, or Firm*—Baker & Botts

[57] ABSTRACT

A helmet mount (10) for night vision goggles (12) is disclosed that is formed with a rear clamp (24), front clamp (16), a strap (20) disposed between the front and rear clamps (16, 24), and a goggle mounting structure (14). The goggle mounting structure (14) secures the night vision goggles (12) to the helmet mount (10) and allows the goggles (12) to be placed in a stowed position when not in use and a line-of-sight position when a used. Additionally, the goggle mounting structure (14) has power activator (58, 60, 62, 64) that automatically deactivates the power when the goggles are not in use and activates the power when the goggles are in use. The helmet mount (10) has adapters (80, 86) that allow the mount to be used with various types of night vision goggles.

27 Claims, 3 Drawing Sheets

NIGHT VISION GOGGLE MOUNT

RELATED APPLICATION

This patent application is related to U.S. patent application Ser. No. 08/058,955, filed on May 7, 1993, entitled "Night Vision Goggle Headgear Mount," owned by the same Assignee.

TECHNICAL FIELD OF THE INVENTION

The present invention relates in general to night vision equipment, and more particularly, to a system and method for mounting night vision goggles to a helmet.

BACKGROUND OF THE INVENTION

Night vision goggles are standard equipment used by military personnel to facilitate nocturnal activities and activities that occur in places with minimal light. Night vision goggles are generally adapted for amplifying light as it reflects off objects so that objects are observable essentially in the dark. Starlight or light from the moon is sufficient to allow an object to be distinguished from its surroundings. Such a night vision goggle is disclosed in U.S. Pat. No. 4,463,252.

Night vision goggles are frequently worn in addition to a helmet or other similar equipment. The night vision goggles are generally mounted on a head gear, facemask, or other similar equipment allowing the wearer to operate the goggles essentially hands free. Having both hands free assists the wearer to carry on other activities while using the goggles.

One method of mounting night vision goggles has been to design a mount for the specific helmet or facemask on which the user desires the night vision goggles. The shortcoming of this approach is that the user cannot switch helmets without designing a new mount specifically for the new helmet. For example, if a wearer desired to use night vision goggles in an Apache helicopter, a helmet mount would have be designed specifically for the helmet used in Apache helicopters. See, e.g., U.S. Pat. No. 4,907,296 ('296 Patent).

In the field, a need arises for soldiers and others to remove their night vision goggles to perform certain tasks. In the past, this has usually required physically removing the night vision goggles from the headgear or facemask, and then when ready to use the goggles again, attaching the goggles. The various approaches for attaching the night vision goggles require a high degree of hand coordination making attachment difficult. The user may have to use one hand to find the mount and the other to guide the night vision goggles to the mount. There have been some designs that have allowed the goggles to be stowed in one position and used in another without disconnecting the goggles from the mount, e.g., the '296 patent, but these designs have not provided a mount that could be used with multiple helmets or headgear and did not provide a convenient power control to terminate the power when the goggles are not in use. This latter shortcoming can be severe for the soldier since night vision goggles emit a light of their own from the eye-receiving portion of the goggles, and snipers and others may be attracted by even short emissions of such light.

In yet another disadvantage of the prior designs, the night vision goggle mounts have frequently been designed to accommodate only one version or type of night vision goggles. Thus, different mounts are required for each type of night vision goggle utilized by a user.

Therefore, a need exists for a mount that may be used with helmets and similar equipment of various sizes and shapes. A need exists for a mount that allows the night vision goggles to be stowed out of the way when not in use, but without detaching the goggles and to easily return the goggles to a position in which they may be used to assist the wearer's vision (line-of-sight position). Additionally, a mount is needed that will automatically adjust the power of the night vision goggles so that it will stop supplying power immediately when the goggles are not being used and will allow power to be supplied when the goggles are placed in the line-of-sight position. Finally, a mount is needed that can accommodate different versions or types of night vision goggles while providing the desired features.

SUMMARY OF THE INVENTION

The disadvantages, shortcomings, and problems associated with the previously developed mounts for night vision goggles have been substantially reduced or eliminated by use of the present invention. A mounting system for night vision goggles with a power supply has front and rear clamps that will accommodate most any helmet, a goggle mounting structure that allows the goggle to be stored in a stowed position when not in use and then rotated or flipped to a position in which the goggles may be used (line-of-sight position).

In accordance with another aspect of the invention, the power supply to the goggles is automatically deactivated when the goggles are placed in the stowed position and the power may be automatically activated when the goggles are placed in the line-of-sight position. (On the PVS-7A goggle, power will automatically be activated; but on the PVS-7B, the ON-OFF switch must be reset to ON before the goggles are reactivated.) This substantially prevents undesired light emissions from the goggles at times when the goggles are not in use.

In accordance with yet another aspect of the present invention, adapters are provided that allow the mount to be used with various versions of night vision equipment.

BRIEF DESCRIPTION OF THE DRAWINGS

For a more complete understanding of the present invention and the advantages thereof, reference is now made to the following description taken in conjunction with the accompanying drawings, in which:

FIG. 6 is a perspective view of one aspect of the present invention showing a magnet used in one embodiment;

DETAILED DESCRIPTION OF THE INVENTION

Figure 1:
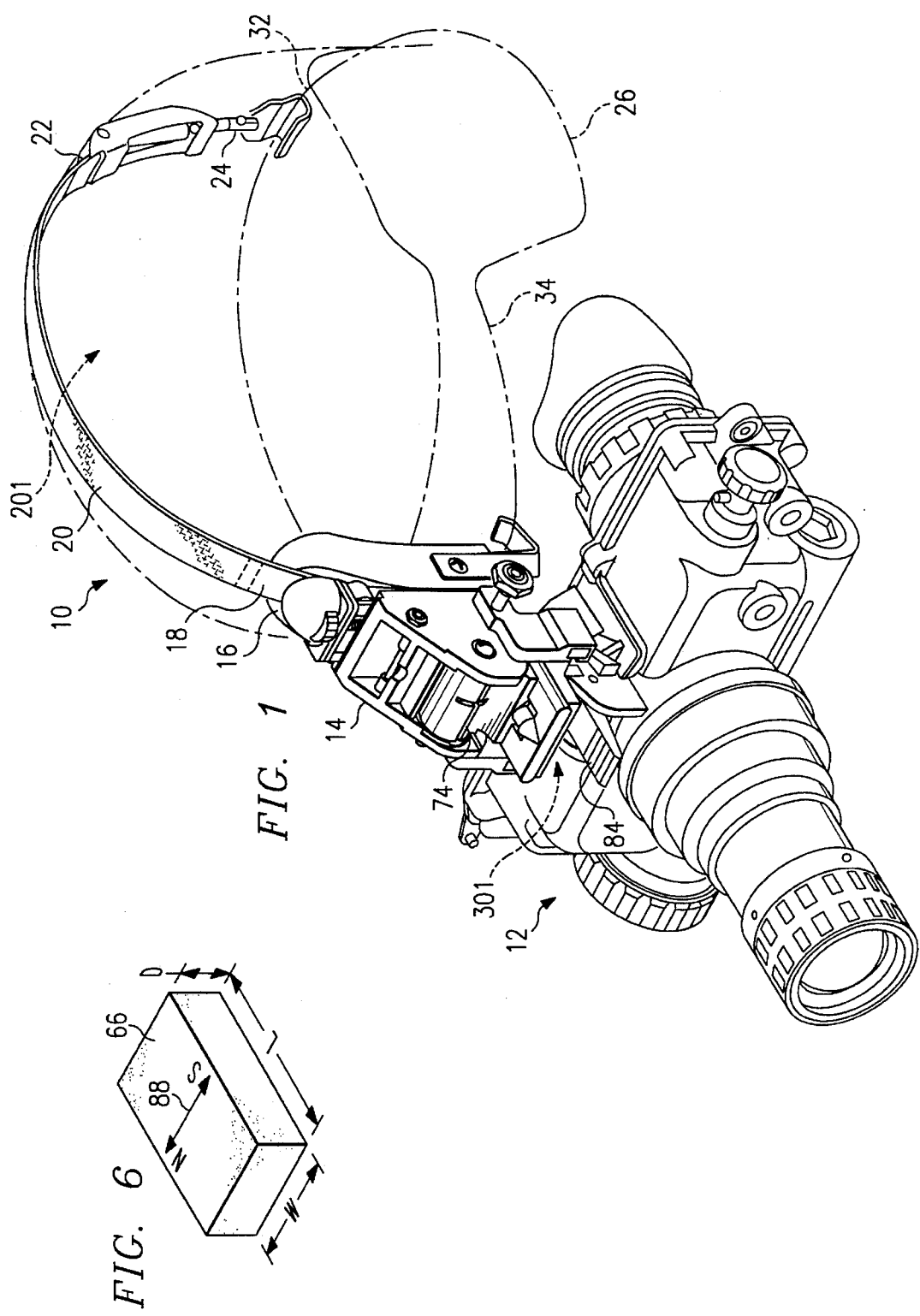
FIG. 1 is a perspective view of the present invention showing night vision goggles attached thereto.

Referring now to the drawings, and more particularly, to FIG. 1, there is shown a helmet mount generally designated 10, which incorporates an embodiment of the present invention. Night vision goggles 12, e.g., AN/PVS-7B or AN/PVS-7A, are attached to a goggle mounting structure 14. Night vision goggle mounting structure 14 is attached to front clamp 16, which is coupled to a strap 20 at a first end 18 and located on the front end of the helmet. A second end 22 of strap 20, which is opposite first end 18, is coupled to rear clamp 24. Strap 20, which is made of a pliable material such as nylon, attaches helmet mount 10 to helmet 26 (shown in phantom lines) by causing front clamp 16 and rear clamp 24 to be in tension with one another and by gripping helmet 26. Strap 20 runs across top portion 201 of helmet 26.

Figure 2:
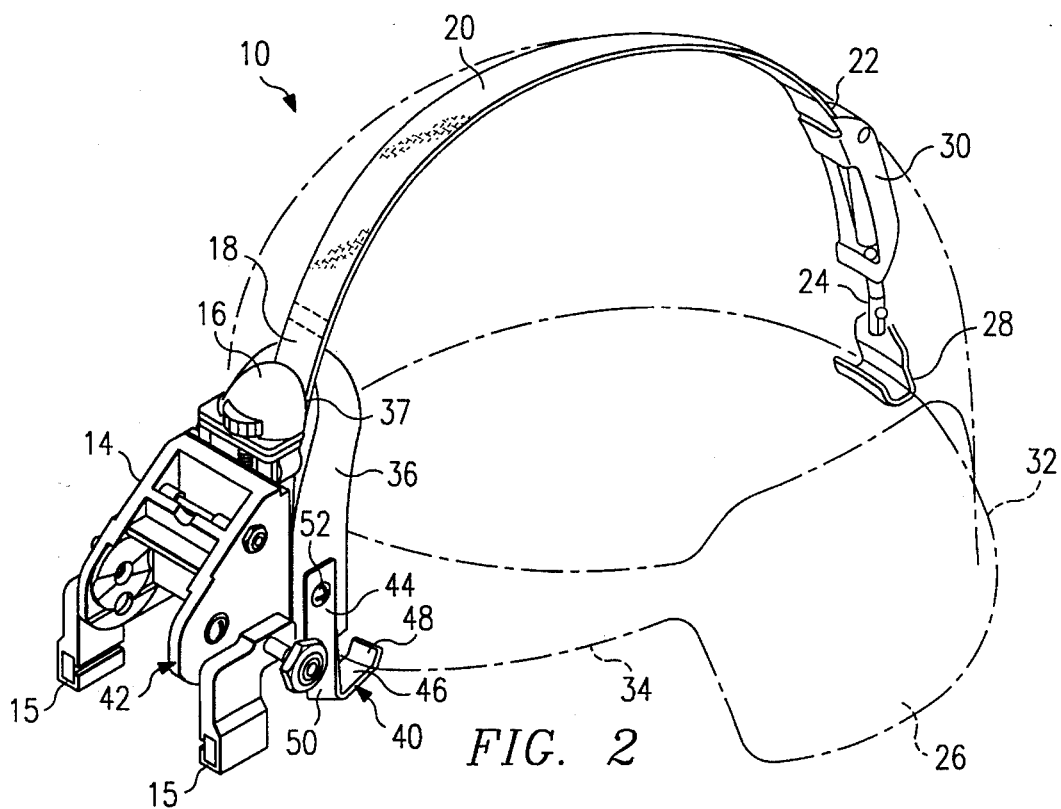
FIG. 2 is a perspective view of the present invention.

Referring now to FIG. 2, the embodiment of FIG. 1 is shown without night vision goggles 12 attached. In accordance with the shown embodiment of the invention, rear clamp 24 is formed by rear helmet clamp 28 and tension latch 30. Tension latch 30, e.g., Camloc part number 17L01-1X3AA, allows the length of strap 20 to be adjusted to fit the specific helmet to which helmet mount 10 is being applied. Tension latch 30 may be used to adjust the force on the front and back clamps. A second end 22 of strap 20 is attached to tension latch 30, and rear helmet clamp 28 is attached to tension latch 30 and grips the back end of the helmet on a helmet lip 32. Tension latch 30 causes a force to pull upward and away from back helmet lip 32. The same force is communicated through strap 20 to front clamp 16 and causes front clamp 16 to pull upwardly on front helmet lip 34.

Front clamp 16 is formed by front swing clamps 38 and 40 (clamp 38 not shown, but is the mirror image of clamp 40 about the centerline of goggle mounting structure 14) and mounting block 36. Goggle mount 42 is attached to front clamp 16 at mounting block 36. Front clamp 16 and goggle mount 42 together form goggle mounting structure 14.

Front swing clamp 38 (not shown) and 40 have a first, second, and third plane 44, 46, and 48 and an intermediate section 50. In the preferred embodiment, swing clamps 38 (not shown) and 40 are made of a formed metal piece. First plane 44 is approximately perpendicular to second plane 46. Intermediate section 50 connects first plane 44 and second plane 46. Adjacent to second plane 46 and angled to it is third plane 48. Front helmet lip 34 rests on second plane 46, and third plane 48 is angled relative to second plane 46 and reaches slightly inside helmet 26. Swing clamps 38 and 40 are secured to mounting block 36 with shoulder screws 52, which allow swing clamps 38 and 40 to rotate relative to mounting block 36. Mounting block 36 has channel 37 for receiving and securing to strap 20. The ability of front swing clamps 38 and 40 to rotate relative to the mounting block and the gripping effect of planes 44, 46 and 48 allow front clamp 16 to be used with a wide variety of helmets and similar equipment.

Figure 3:
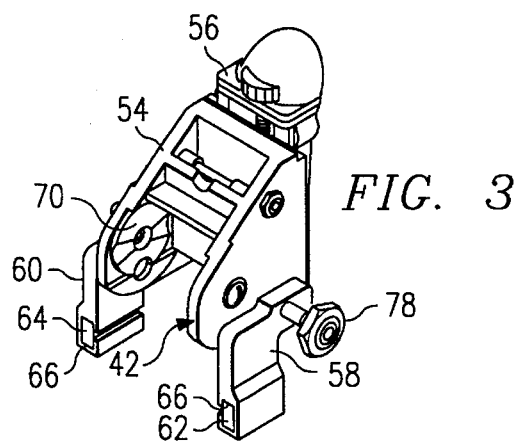
FIG. 3 is a perspective view of one aspect of the present invention showing a goggle mounting structure.

Referring now to FIG. 3, there is shown goggle mount 42. Goggle mount 42 is based on a standard goggle mount used with an ANVIS night vision goggle system well known to those of skill in the art. Goggle mount 42 has frame 54 that is attached to vertical adjustor 56, which allows for adjustment of the vertical height of night vision goggles 12 relative to the wearer's eyes so that goggles 12 may be placed in the line of sight of the user. Magnet mounts or positioners 58 and 60 are secured to the sides of frame 54. The lower portion of magnet mounts 58 and 60 hold magnets 62 and 64. The north poles for magnets 62 and 64 are designated 66.

Magnet 62 may be attached to the goggle mount 42 with its north pole at the upper most vertical portion of magnet 62 as attached. Magnet 64 may be attached to the goggle mount 42 with its north pole at the lowest most vertical portion of magnet 64 as attached. Magnets 62 and 64 are described in more detail in conjunction with the discussion of FIG. 6 below. Goggle mount 42 is designed to receive an ANVIS ball-and-socket insert 68 (see FIGS. 4 and 5). Goggle mount 42 has sockets 70 which are designed to receive and hold outwardly forced balls 72 of ball-and-socket insert 68 (see FIGS. 4 and 5). Ball-and-socket insert 68 is allowed to rotate between two positions. The two positions are defined by grooves 74 and 76 in ball-and-socket insert 68. Release lever 78 permits the ball-and-socket insert to rotate between two grooves 74 and. 76. The two positions defined by grooves 74 and 76 are the line of sight position and the stowed position. In the line of sight position, goggles 12 are in the line of sight of the user and may be used to enhance the wearer's vision. The stowed position allows the goggles to be above the line-of-sight of the user, but goggles may be quickly and easily returned to the line-of-sight position by depressing release button 78 and rotating or flipping the goggles downwardly.

Figure 4:
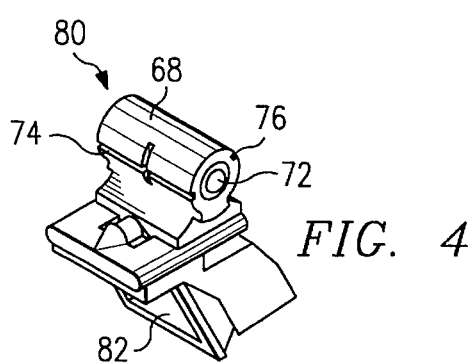
FIG. 4 is a perspective view of one aspect of the present invention showing an AN/PVS-7B adapter.
Figure 7:
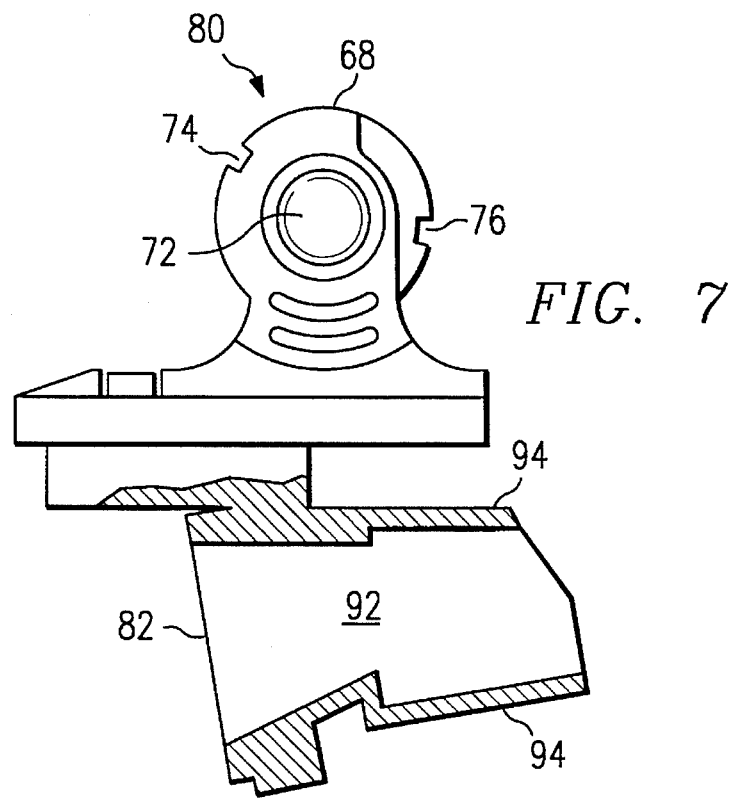
FIG. 7 is a partial cutaway cross-sectional view of one aspect of the present invention showing the AN/PVS-7B adapter.

Referring now to FIG. 4, there is shown one aspect of the present invention that allows the helmet mount to be used with AN/PVS-7B night vision goggles. This aspect of the present invention may be referred to generally as a 7B adapter 80. The upper portion of 7B adapter 80 is a standard ANVIS ball-and-socket insert well known to those of skilled in the art. As previously described, outwardly forced balls 72 engage sockets 70 and thereby secure the adapter into goggle mount 42. Grooves 74 and 76 allow the adapter, and goggles 12 since they are attached to adapter 80, to rotate between two positions. Adapter 80 has receptacle 82 formed in the lower portion or bottom surface of adapter 80 to receive and hold a tapered stud on night vision goggles 12. Receptacle 82 is shown a partial cut away cross-sectional view in FIG. 7. Receptacle 82 has a hollow section 92 formed by walls 94. The tapered stud is released from receptacle 82 when release 84 is depressed (see FIG. 1).

Figure 5:
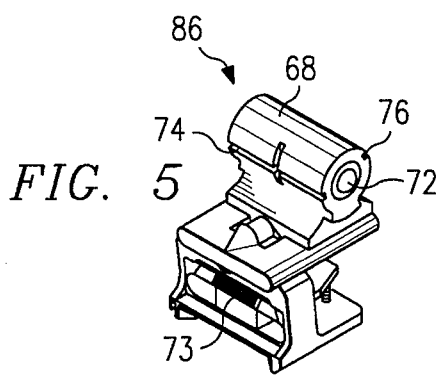
FIG. 5 is a perspective view of one aspect of the present invention showing an AN/PVS-7A adapter.
Figure 8:
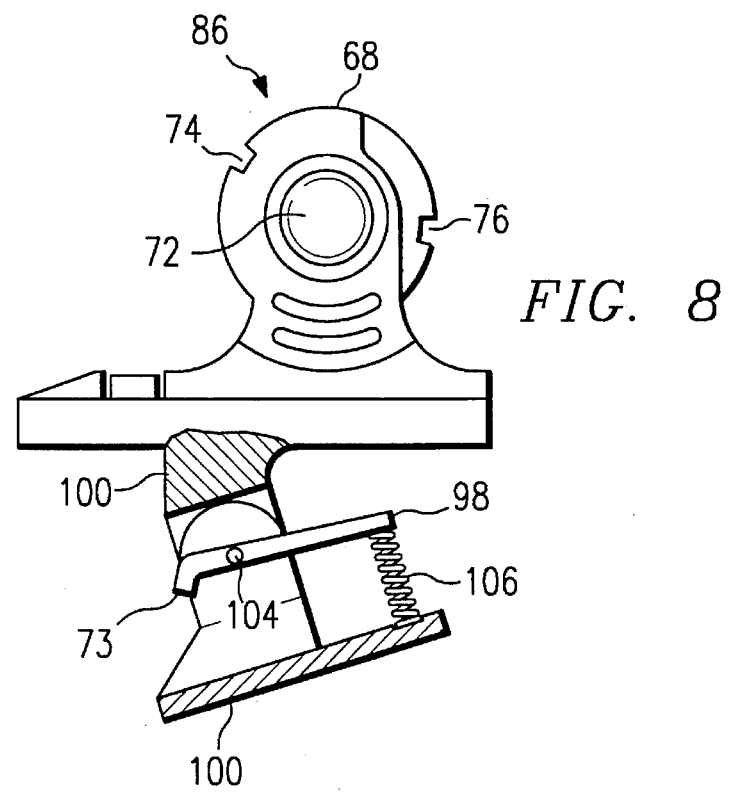
FIG. 8 is a partial cutaway cross-sectional view of one aspect of the present invention showing the AN/PVS-7A adapter.

Referring now to FIG. 5, there is shown one aspect of the present invention that allows helmet mount 10 to be used with an AN/PVS-7A night vision goggle; the adapter may be referred to generally as a 7A adapter 86. As previously discussed, adapter 86 has two grooves 74 and 76 which define two positions in which night vision goggles 12 may be placed. Adapter 86 has ball-and-socket insert 68 that engages sockets 70 in goggle mount 42 and thereby secures to helmet mount 10. The upper portion of adapter 86 is a standard ANVIS ball-and-socket insert. The lower portion or bottom surface of adapter 86 has receptacle 73, which has been formed to receive a tapered stud on the 7A goggles. A partial cutaway cross-sectional view of adapter 86 is shown in FIG. 8. Adapter 86 has receptacle 73 which is formed by walls 100. Walls 100 form a cavity for receiving a tapered stud on the goggles 12. Disposed across the cavity is a releasing plate or lever 98, which is pivoted about pin 104 and biased by spring 106. Like 7B adapter 80, the 7A adapter 86 allows goggle mount 42 to hold the 7A goggles until released, which is accomplished on the 7A adapter 86 by depressing release 98.

Referring now to FIG. 6, there is shown a magnet which may be magnet means 15 comprised of magnets 62 or 64. In the preferred embodiment, the magnet is sized to have a width, W, of 0.375 inches, a length, L, of 0.625 inches, and a depth, D, of 0.187 inches. Line 88 shows the magnetic orientation of magnets 62 and 64. The north pole of magnet 62 and 64 is designated 66. The magnets may be made of neodymium iron boron (NdFe).

Magnets 62 and 64 are incorporated in the present invention in order to adjust the power supply to night vision goggles 12. The AN/PVS-7A and AN/PVS-7A goggles utilize a magnetic reed switch shown generally by reference numeral 301. The magnetic fields produced by magnets 62 and 64 serve to trip the magnetic reed switch of these goggles. Both magnets are not required for every type of night vision goggle, e.g., one magnet would suffice for the 7A goggles, but to make the helmet mount 10 operable with most all night vision goggles with internal power supplies, two magnets have been included to create a sufficient magnetic field.

In operation the magnets (62, 64) control or adjust the goggle reed switch so that when goggles 12 are in the line-of-sight position, the magnetic field produced by magnets 62 and 64 cause the magnetic reed switch to be in the closed position. When goggles 12 are rotated to the stowed position, the magnetic field produced by magnets 62 and 64 cause the magnetic reed switch to be in the open position. Thus, the power to the night vision goggles 12 is automatically adjusted according to the position of goggles 12.

Although the present invention has been described in detail, it should be understood that various changes, substitutions, and alterations can be made hereto without departing from the spirit and scope of the invention as defined by the appended claims.

What is claimed is:

1. A system for mounting night vision goggles, having a power source to any of a variety of differently sized helmets and for allowing the goggles to rotate between a stowed position and a line-of-sight position, comprising:
   a rear clamp for attaching to a back end of the helmet;
   a front clamp for attaching to the front end of the helmet;
   a flexible strap for coupling the rear and front clamps and for applying tension between them over a top portion of the helmet; and
   a goggle mounting structure attached to the front clamp for receiving the goggles.

2. The system of claim 1 wherein the goggles contain a magnetic reed switch and wherein said goggle mounting structure further comprises a magnet means attached to the goggle mounting structure for adjusting power supplied to the goggles in accord to the position of the goggles.

3. The system of claim 2 wherein said magnet means comprises a first and second magnet.

4. An apparatus for mounting night vision goggles to a helmet comprising:
   a rear clamp for attaching to a back end of the helmet;
   a front clamp for attaching to the front end of the helmet;
   a strap connected to the rear clamp and the front clamp and for extending across a top portion of the helmet for maintaining a force on the front and rear clamps; and
   a goggle mount attached to the front clamp for securing the goggles to the apparatus.

5. The apparatus of claim 4 wherein the rear clamp further comprises a tension latch for adjusting the force on the front and back clamps.

6. The apparatus of claim 4 wherein the front clamp comprises a front swing clamp and a mounting block.

7. The apparatus of claim 6, wherein the night vision goggles further comprise a magnetic reed switch for opening and closing a power switch to the goggles, and wherein the goggle mount comprises:
   a mounting block secured to the strap and to the front clamp;
   a goggle mount attached to the mounting block for receiving and securing the goggles and for allowing the goggles to rotate between a line-of-sight position and a stowed position; and
   a magnetic means attached to the goggle mount for adjusting the magnetic reed switch of the goggles so that the power is supplied when the goggles are in the line-of-sight position and is not supplied when the goggles are in the stowed position.

8. The apparatus of claim 7 wherein said magnetic means comprises first and second magnets.

9. The apparatus of claim 4 wherein the strap comprises a pliable material.

10. The apparatus of claim 4 wherein the strap comprises a nylon strap.

11. An apparatus for mounting night vision goggles to a helmet comprising:
    a rear clamp for attaching to a back end of the helmet;
    a front clamp for attaching to the front end of the helmet;
    a strap connected to the rear clamp and the front clamp and running across a top portion of the helmet for maintaining a force on the front and rear clamps;
    a goggle mount attached to the front clamp for securing the goggles to the apparatus;
    wherein the front clamp comprises:
       a front swing clamp,
       and a mounting block; and
    wherein the swing clamp comprises a formed metal piece having:
       a first plane attached to the goggle mounting structure,
       a second plane perpendicular to the first plane for receiving a lip of the helmet,
       at least one intermediate section between the first and the second planes, and
       a third plane formed at an angle to the second plane for holding the helmet lip on the second plane of the formed metal piece.

12. The apparatus of claim 11 wherein the first plane is attached to the mounting block with a shoulder screw.

13. An apparatus for mounting night vision goggles that use a reed switch to a helmet comprising:
    a rear helmet clamp;
    a tension latch attached to the rear clamp;
    a first and second front swing clamp;
    a mounting block secured to the first and second front swing clamp;
    a goggle mount secured to the mounting block for receiving and removably securing the goggles; and
    a pliable strap with a first end secured to the tension latch and a second end secured to the mounting block to hold the apparatus to the helmet.

14. The apparatus of claim 13 wherein the mounting block further comprises a channel for receiving the second end of the pliable strap.

15. An apparatus for adjusting the power supplied to night vision goggles according to whether the goggles are in a line-of-sight position or in a stowed position, comprising:
    a goggle mount for enabling rotation of the goggles between the line-of-sight position in which the goggles are activated and a stowed position in which the goggles are deactivated;
    a first magnet attached to the goggle mount having a vertical magnetic orientation with a north pole at the upper most vertical portion of the first magnet; and a second magnet attached to the goggle mount opposite the first magnet and having a vertical magnetic orientation with a north pole at the lowest vertical portion of the second magnet.

16. The apparatus of claim 15 wherein the first and second magnet are oriented to be mirror images of one another about a centerline of the goggle mount, yet with oppositely aligned magnetic poles.

17. The apparatus of claim 15 wherein the first and second magnet are sized to have a length of 0.625 inches, a width of 0.375 inches, and a depth of 0.187 inches.

18. The apparatus of claim 15 wherein the first and second magnet are made of neodymium-iron-boron (NdFE).

19. A helmet mount for attaching night vision goggles to a helmet so that a wearer may select between a stowed position for the goggles in which the power to the goggles is not supplied and a line-of-sight position in which the power to the goggles is supplied, comprising:

a rear helmet clamp for gripping the back end of the helmet;

a mounting block;

a goggle mount attached to the mounting block for receiving and securing the goggles and for allowing the goggles to rotate between the line-of-sight position and the stowed position;

a first and second magnet attached to the goggle mount for activating a reed switch incorporated into the goggles so that the power is supplied in the line-of-sight position and not supplied in the stowed position;

a first and second front swing clamp secured to the mounting block for gripping the front end of the helmet;

a tension latch attached to the rear helmet clamp;

a strap of pliable material having a first and a second end, the first end of the strap is secured to the tension latch and the second end is secured to the mounting block; and the tension latch for maintaining the desired tension in the strap of pliable material.

20. The helmet mount of claim 19 wherein the goggle mount further comprises an adapter for receiving an AN/PVS-7A.

21. The helmet mount of claim 19 wherein the goggle mount further comprises an adapter for receiving an AN/PVS-7B.

22. A method for mounting night vision goggles having an internal power supply to a helmet and for allowing the goggles to flip up to a stowed position or flip down to a line-of-sight position and to have the power automatically on when in the line-of-sight position and automatically off in the stowed position, comprising the steps of:

attaching a rear clamp to a back end of the helmet;

attaching a front clamp to the front end of the helmet;

connecting a strap to the rear clamp and the front clamp;

maintaining a force on the front and back clamps;

attaching a goggle mounting structure to the front clamp for receiving and holding the night vision goggles;

activating the internal power supply when in the line-of-sight position; and deactivating the internal power supply when in the stowed position.

23. A method for mounting night vision goggles to a helmet comprising the steps of:

attaching a rear clamp to a back end of the helmet;

attaching a front clamp to the front end of the helmet;

passing a flexible strap across a top portion of the helmet;

connecting the flexible strap to the rear clamp and to the front clamp;

creating tension in the strap to hold the rear and front clamps securely to the helmet;

attaching a goggle mounting structure to the front clamp; and securing the night vision goggles to the goggle mounting structure.

24. A method of manufacturing a night vision goggle helmet mount for securing night vision goggles to a variety of differently sized helmets comprising the steps of:

providing a rear helmet clamp;

securing a tension latch to the rear helmet clamp;

providing a goggle mount;

forming a mounting block with one side for attaching to the goggle mount and one side for resting against a front end of the helmet;

securing rotatable swing clamps to the mounting block for gripping a front end of the helmet;

attaching the goggle mount to the mounting block; and securing a strap to the mounting block and the tension latch.

25. The method of claim 24 wherein the step of providing a goggle mount comprises providing a goggle mount for attaching the night vision goggles and for allowing the night vision goggles to rotate between a line-of-sight position and a stowed position.

26. The method of claim 24 further comprising the steps of:

providing a power activator for controlling a power supply to the goggles according the position of the goggles; and securing the power activator to the goggle mount.

27. The method of claim 26 wherein the step of providing a power activator comprises the steps of:

attaching a first magnet mount to the goggle mount;

attaching a second magnet mount to the goggle mount;

attaching a first magnet to the first magnet mount; and attaching a second magnet to the second magnet mount.

* * * * *